(12) United States Patent
Jeong et al.

(10) Patent No.: US 10,190,677 B2
(45) Date of Patent: Jan. 29, 2019

(54) SYSTEM AND METHOD FOR DETERMINING STARTING TENDENCY OF DRIVER

(71) Applicants: Hyundai Motor Company, Seoul (KR); Kia Motors Corporation, Seoul (KR)

(72) Inventors: Donghoon Jeong, Osan-si (KR); Byeongwook Jeon, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 603 days.

(21) Appl. No.: 14/540,904

(22) Filed: Nov. 13, 2014

(65) Prior Publication Data

US 2016/0084373 A1 Mar. 24, 2016

(30) Foreign Application Priority Data

Sep. 22, 2014 (KR) ........................ 10-2014-0126186

(51) Int. Cl.
*F16H 61/02* (2006.01)
*F02D 29/02* (2006.01)
(Continued)

(52) U.S. Cl.
CPC ......... *F16H 61/0202* (2013.01); *F02D 29/02* (2013.01); *F02D 41/0215* (2013.01);
(Continued)

(58) Field of Classification Search
CPC .... F02D 29/02; F02D 41/0215; F02D 41/062; F02D 2200/501; F02D 2200/602;
(Continued)

(56) References Cited

U.S. PATENT DOCUMENTS

| 5,189,621 A * | 2/1993 | Onari ................ B60K 31/0008 |
| | | 123/480 |
| 5,895,435 A * | 4/1999 | Ohta ................... F16H 61/0213 |
| | | 477/120 |
| 8,437,917 B2 * | 5/2013 | Miah ..................... B60W 10/06 |
| | | 701/100 |
| 8,965,644 B2 * | 2/2015 | Jeon ................... F16H 61/0213 |
| | | 701/57 |
| 8,983,743 B2 * | 3/2015 | Jeon ................... B60W 30/182 |
| | | 701/57 |

(Continued)

FOREIGN PATENT DOCUMENTS

| CN | 1736780 A | 2/2006 |
| CN | 101633358 A | 1/2010 |

(Continued)

*Primary Examiner* — Dirk Wright
(74) *Attorney, Agent, or Firm* — Morgan, Lewis & Bockius LLP (57) ABSTRACT

A system of determining starting tendency of a driver may include: a vehicle speed sensor detecting a vehicle speed an accelerator pedal position sensor detecting an accelerator pedal position, and a controller receiving information on input variables including the accelerator pedal position, the vehicle speed from the accelerator pedal position sensor or the vehicle speed sensor, determining a short term driving tendency, a long term driving tendency, and a starting tendency of the driver based on the information, and controlling an engine or a transmission according to the short term driving tendency, the long term driving tendency, and the starting tendency, in which the controller continuously determines the short term driving tendency of the driver for a predetermined time and determines the starting tendency of the driver from a predetermined number (n) of the short term driving tendencies of the driver.

9 Claims, 4 Drawing Sheets

(51) Int. Cl.
*F02D 41/02* (2006.01)
*F02D 41/06* (2006.01)
*F16H 59/00* (2006.01)

(52) U.S. Cl.
CPC ....... *F02D 41/062* (2013.01); *B60W 2540/10* (2013.01); *B60W 2540/30* (2013.01); *B60W 2710/06* (2013.01); *B60W 2710/10* (2013.01); *B60Y 2300/18025* (2013.01); *F02D 2200/501* (2013.01); *F02D 2200/602* (2013.01); *F02D 2200/606* (2013.01); *F02D 2200/701* (2013.01); *F02D 2250/21* (2013.01); *F02N 2300/104* (2013.01); *F16H 2059/003* (2013.01); *F16H 2061/023* (2013.01); *F16H 2312/02* (2013.01)

(58) Field of Classification Search
CPC ......... F02D 2200/606; F02D 2200/701; F02D 2250/21; F16H 61/0202; B60W 2540/10; B60W 2540/30; B60W 2710/06; B60W 2710/10; F02N 2300/104
See application file for complete search history.

(56) References Cited

U.S. PATENT DOCUMENTS

| | | | | |
|---|---|---|---|---|
| 9,193,357 | B2* | 11/2015 | Jeon | B60W 50/10 |
| 9,315,189 | B2* | 4/2016 | Mould | B60W 10/08 |
| 2014/0365088 | A1* | 12/2014 | Jeon | B60W 30/182 |
| | | | | 701/51 |
| 2016/0039425 | A1* | 2/2016 | Jeon | B60W 10/04 |
| | | | | 701/59 |

FOREIGN PATENT DOCUMENTS

| | | |
|---|---|---|
| CN | 102132075 A | 7/2011 |
| CN | 103895637 A | 7/2014 |
| JP | 3446438 B2 | 9/2003 |
| JP | 2010-052561 A | 3/2010 |
| JP | 2013-155632 A | 8/2013 |
| KR | 10-2009-0070041 A | 7/2009 |
| KR | 10-1326543 B1 | 11/2013 |
| KR | 10-2014-0085143 A | 7/2014 |

* cited by examiner

SYSTEM AND METHOD FOR DETERMINING STARTING TENDENCY OF DRIVER

CROSS-REFERENCE TO RELATED APPLICATION

The present application claims priority to Korean Patent Application No. 10-2014-0126186 filed Sep. 22, 2014, the entire contents of which is incorporated herein for all purposes by this reference.

BACKGROUND OF THE INVENTION

Field of the Invention

The present invention relates to a system and method for determining a starting tendency of a driver. More particularly, the present invention relates to a system and method for determining a starting tendency of a driver and controlling a shift using the same that precisely reflect a will of a driver regarding the shift by determining a starting tendency of the driver more precisely.

Description of Related Art

Customer satisfaction related to driving performance of a vehicle depends on how precisely the vehicle runs in accordance with a tendency of the customer. While tendencies of customers vary, however, performance characteristics of the vehicle are set to be the same in the same vehicle model. Therefore, reaction of the vehicle may not coincide with the tendency of the customer. Accordingly, the customer often lodges a complaint regarding the driving performance of the vehicle. That is, if the driving tendency of the customer is grasped and a shift of the vehicle is controlled to coincide with the tendency of the customer, the customer satisfaction related to the driving performance may be maximized.

Meanwhile, when travelling performance of a vehicle is assessed, a start feeling is very important. Starting control refers to engine control and transmission control when the vehicle starts. In order to maximize acceleration performance of the vehicle during the starting control, a quick torque increment and reactivity is very important element, but an overly quick torque increment worsens the start feeling of the driver.

According to conventional starting control, the engine torque is controlled according to a predetermined torque filter and a predetermined torque map in a predetermined shift-speed regardless of a driver's tendency. Therefore, a driver having a sporty tendency may feel that the shift-speed is delayed, and a driver having a mild tendency may feel that the shift-speed is too fast.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a system and a method of determining a starting tendency of a driver having advantages of performing a starting control according to a driver's starting tendency.

According to various aspects of the present invention, a system of determining starting tendency of a driver may include a vehicle speed sensor detecting a vehicle speed, an accelerator pedal position sensor detecting an accelerator pedal position, and a controller receiving information on input variables including the accelerator pedal position, the vehicle speed from the accelerator pedal position sensor or the vehicle speed sensor, determining a short term driving tendency, a long term driving tendency, and a starting tendency of the driver based on the information, and controlling an engine or a transmission according to the short term driving tendency, the long term driving tendency, and the starting tendency, in which the controller continuously determines the short term driving tendency of the driver for a predetermined time and determines the starting tendency of the driver from a predetermined number (n) of the short term driving tendencies of the driver.

The controller may determine the starting tendency of the driver from latest n short term driving tendencies of the driver.

The controller may determine the starting tendency of the driver when the vehicle is not initially stopped and a variation of the accelerator pedal position is greater than a predetermined value after a control mode according to the starting tendency of the driver and a starting tendency determination mode are activated.

The control mode of the starting tendency of the driver may be activated when the vehicle speed is less than a predetermined vehicle speed.

The controller may determine the starting tendency of the driver when a predetermined time passes after the variation of the accelerator pedal position is greater than the predetermined value and a filtering time passes.

The controller may determine the starting tendency (SI_start) of the driver from the equation of $$SI\_start = \frac{\sum_{i=1}^{n} SI\_Avg_{n-i+1} \times W_i}{nT_1},$$

wherein $SI\_Avg_i$ represents an i-th short term driving tendency of the driver, $T_1$ represents the predetermined time, and $W_i$ represents an i-th weight value.

The weight values may satisfy a relation of $W_i \leq W_{i+1}$.

A sum of n weight values may be 1.

According to various aspects of the present invention, a method of determining a starting tendency of a driver may include detecting data for determining a long term driving tendency, a short term driving tendency, and a starting tendency of the driver, determining whether a vehicle speed is less than a predetermined vehicle speed, activating a control mode of the starting tendency, determining a starting tendency index from latest n short term driving tendency indexes, and controlling a shift-speed according to a long term driving tendency index.

The starting tendency of the driver may be determined when the vehicle is not initially stopped and a variation of the accelerator pedal position is greater than a predetermined value after the control mode according to the starting tendency of the driver and a starting tendency determination mode are activated.

The starting tendency (SI_start) of the driver is determined from the equation of:

$$SI\_start = \frac{\sum_{i=1}^{n} SI\_Avg_{n-i+1} \times W_i}{nT_1},$$

wherein $SI\_Avg_i$ represents an i-th short term driving tendency of the driver, $T_1$ represents the predetermined time, and $W_i$ represents an i-th weight value.

The weight values may satisfy a relation of $W_i \leq W_{i+1}$.

A sum of n weight values may be 1.

The control mode according to the starting tendency of the driver may be activated when the vehicle speed is less than the predetermined vehicle speed.

The starting tendency of the driver may be determined when a predetermined time passes after the variation of the accelerator pedal position is greater than a predetermined value and a filtering time passes.

According to various aspects of the present invention, since the starting control is controlled according to a driver's starting tendency, a driver's satisfaction of the travelling performance is improved.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In addition, the size and thickness of each configuration shown in the drawings are arbitrarily shown for better understanding and ease of description, but the present invention is not limited thereto. In the drawings, the thickness of layers, films, panels, regions, etc., are exaggerated for clarity.

Figure 1:
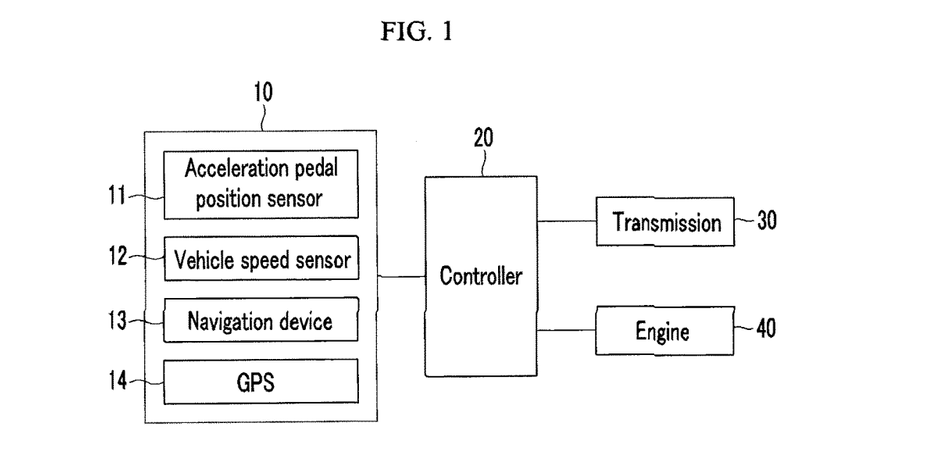
FIG. 1 is a block diagram of an exemplary system for determining a starting tendency of a driver according to the present invention.

FIG. 1 is a block diagram of a system for determining a starting tendency of a driver according to an exemplary embodiment of the present invention.

As shown in FIG. 1, a system of determining a starting tendency of a driver according to various embodiments of the present invention includes a data detector 10, a controller 20, an engine 40, and transmission 30.

The data detector 10 detects data for determining a long term driving tendency, a short term driving tendency, and a starting tendency of the driver, and the data detected by the data detector 10 is transmitted to the controller 20. The data detector 10 includes an accelerator pedal position sensor 11, a vehicle speed sensor 12, and a navigation device 13 including a global positioning system (GPS) 14.

The accelerator pedal position sensor 11 detects a degree at which a driver pushes an accelerator pedal. That is, the accelerator pedal position sensor 11 detects data related to a driver's acceleration will.

The vehicle speed sensor 12 detects a vehicle speed, and is mounted at a wheel of the vehicle. On the contrary, the vehicle speed may be calculated based on a GPS signal received by the GPS 14.

A target shift-speed may be calculated by using a shift pattern based on the signal of the accelerator pedal position sensor 11 and the signal of the vehicle speed sensor 12, and the shift to the target shift-speed is controlled. That is, hydraulic pressure supplied to a plurality of friction elements or released from the plurality of friction elements is controlled in an automatic transmission provided with a plurality of planetary gear sets and the plurality of friction elements. In addition, a current applied to a plurality of synchronizer devices and actuators is controlled in a double clutch transmission.

The navigation device 13 informs the driver of a route to a destination. The navigation device 13 includes an input/output portion inputting or outputting information for guidance of the route, a current position detecting portion detecting information on a current position of the vehicle, a memory in which map data for calculating the route and data for guiding the route are stored, and a control portion for searching the route and performing guidance of the route. However, it is sufficient in an exemplary embodiment of the present invention for the navigation device 13 to be able to provide information on a road shape such as a gradient of a road or a curvature radius of the road to the controller 20. Therefore, it is to be understood that the navigation device 13 includes any device which can provide the information on the road shape to the controller 20 in this specification and the claims.

The GPS 14 receives a signal transmitted from a GPS satellite and transmits a signal corresponding thereto to the navigation device 13.

The controller 20 determines a short term driving tendency of the driver that is a driving tendency for a comparatively short time based on the data detected by the data detector 10. That is, the controller 20 determines the driving tendency of the driver, for example, during current driving or for a predetermined time in the current driving. The short term driving tendency of the driver may be determined based on how well one or more assumptions related to the driving tendency of the driver are satisfied, and fuzzy control theory may be used to determine the short term driving tendency of the driver. For these purposes, the controller 20 can be realized by one or more processors activated by a predetermined program, and the predetermined program can be programmed to perform each step of a method of determining a starting tendency according to various embodiments of the present invention.

The controller 20 includes a short term driving tendency index calculator, a memory, a long term driving tendency index calculator, and a starting tendency calculator.

The short term driving tendency index calculator determines the short term driving tendency of the driver for a comparatively short time based on the data detected by the data detector 10. That is, the short term driving tendency index calculator determines the driving tendency of the driver, for example, during current driving or for a predetermined time in the current driving. The short term driving tendency of the driver may be determined based on how well one or more assumptions related to the driving tendency of the driver are satisfied, and fuzzy control theory may be used to determine the short term driving tendency of the driver. The short term driving tendency of the driver determined by the short term driving tendency index calculator is calculated as a short term driving tendency index, and the short term driving tendency index is transmitted to and is stored in the memory.

The memory stores the short term driving tendency index calculated by the short term driving tendency index calculator. The memory is provided with n cells, and the short term driving tendency index and a weight value are stored in each cell. That is, an (n−i+1)-th short term driving tendency index $SI\_Avg_{n-i+1}$ and an i-th weight value $W_i$ are stored in an i-th cell. If a new short term driving tendency index $SI\_Avg_1$ is calculated, an i-th short term driving tendency index is newly stored as an (i+1)-th short term driving tendency index and a previous n-th short term driving tendency index $SI\_Avg_n$ is deleted. That is, only the latest n short term driving tendency indexes are always stored in the memory.

The weight values are set according to design scheme of a designer. The weight values may be tuned, but may be maintained for a long time once the weight values are stored. A sum of the n weight values is 1, and an i-th weight value is smaller than or equal to an (i+1)-th weight value. The latest short term driving tendency index exercises greatest influence over the long term driving tendency index by setting the (i+1)-th weight value to be larger than or equal to the i-th weight value.

The long term driving tendency index calculator determines the long term driving tendency of the driver from the n short term driving tendency index stored in the memory. The long term driving tendency of the driver determined by the long term driving tendency index calculator is calculated as a long term driving tendency index.

The starting tendency index calculator determines the long term driving tendency of the driver from the n short term driving tendency index stored in the memory. The starting tendency of the driver determined by the starting tendency index calculator is calculated as a starting index. At this time, the starting index calculated by the starting tendency index calculator is determined as an individual reference, unlike the long term driving tendency.

For example, assume that the starting tendency index is determined within a range of 1-10. At this time, it is determined that the starting tendency is mild when the starting tendency index is within the range of 1-3, the starting tendency is normal when the starting tendency index is within the range of 3-7, and the starting tendency is sporty when the starting tendency index is within the range of 7-10.

On the contrary, assume that the long term driving tendency index is determined within a range of 1-10. At this time, it is determined that the long term driving tendency of the driver is mild when the long term driving tendency index is within the range of 1-2, the long term driving tendency of the driver is normal when the long term driving tendency index is within the range of 2-8, and the long term driving tendency of the driver is sporty when the long term driving tendency index is within the range of 8-10.

The controller 20 controls the transmission 30 or the engine 40 according to the short term driving tendency, the long term driving tendency, and the starting tendency. That is, the controller 20 may change a shift pattern, an engaging feeling to the target shift-speed, an engine torque map, and/or an engine torque filter according to the short term driving tendency, the long term driving tendency, and the starting tendency.

Hereinafter, a method of determining a starting tendency of a driver according to various embodiments of the present invention will be described in detail.

Figure 2:
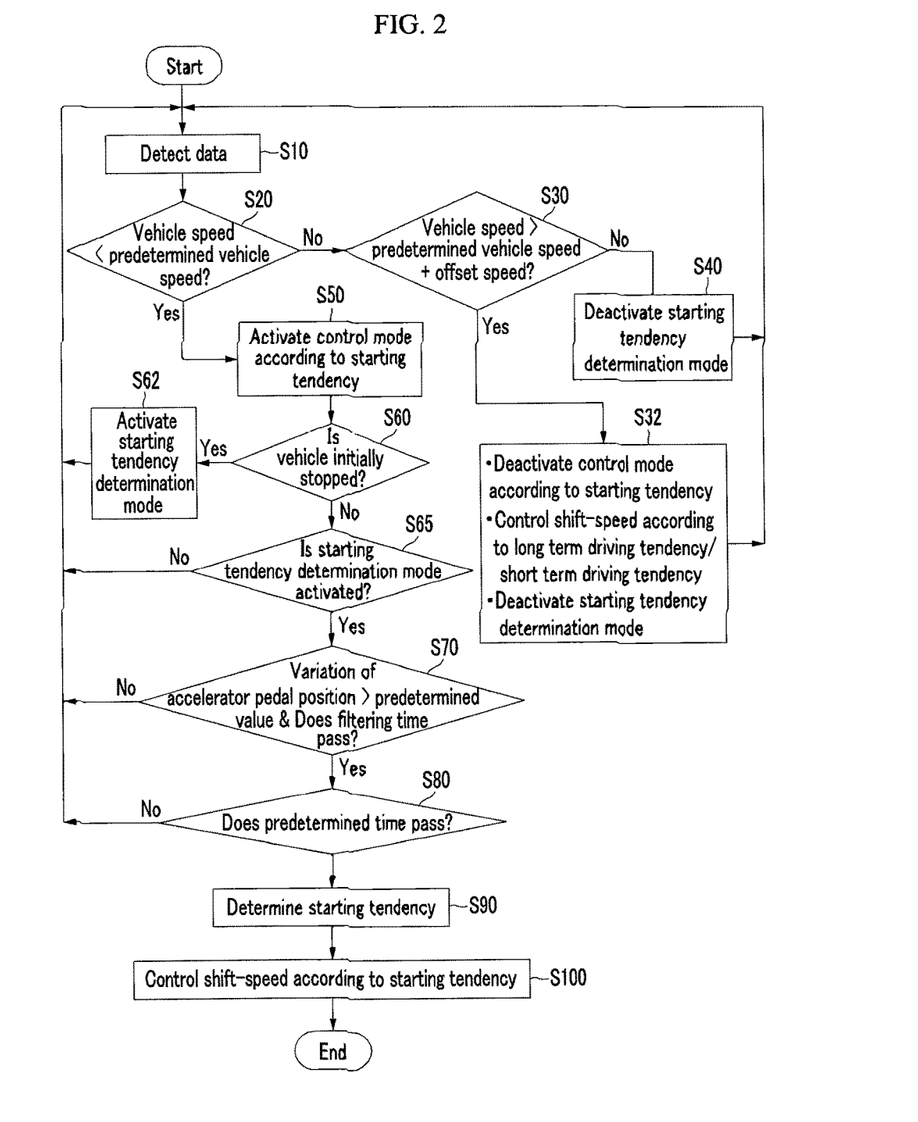
FIG. 2 is a flowchart of an exemplary control method according to the driver's starting tendency according to the present invention.

FIG. 2 is a flowchart of a control method according to a driver's starting tendency according to various embodiments of the present invention.

As shown in FIG. 2, the data detector 10 detects data for determining the short term driving tendency, the long term driving tendency, and the starting tendency at step S10. Detected data is transmitted to the controller 20.

The controller 20 determines whether a vehicle speed is less than a predetermined vehicle speed at step S20.

When the vehicle speed is less than the predetermined vehicle speed, the controller 20 activates a control mode according to the starting tendency at step S50. The control mode according to the starting tendency means that shift-speed is controlled according to long term driving tendency and short term driving tendency, in addition to the starting tendency.

At this time, when the starting tendency is higher than the long term driving tendency or short term driving tendency, the shift-speed is preferentially controlled according to the starting tendency compared to the long term driving tendency or the short term driving tendency. For example, when the starting tendency is sporty and the long term driving tendency is mild, while the short term driving tendency is normal, the shift-speed is controlled according to the starting tendency (sporty).

The controller 20 determines whether the vehicle is initially stopped (vehicle speed is zero) after activation of the control mode according to the starting tendency at step S60. If the vehicle is initially stopped, a starting tendency determination mode is activated at step S62, and moves to the step S10.

The activation of the starting tendency determination mode means that the controller 20 determines whether various conditions are satisfied and determines the starting tendency of the driver.

If the vehicle is not initially stopped, the controller 20 determines whether the starting tendency determination mode is activated at step S65.

When the starting tendency determination mode is activated, the controller 20 determines whether a variation of an accelerator pedal position is greater than a predetermined value and a filtering time passes at step S70. The controller 20 determines whether a predetermined time passes at step S80.

After the predetermined time passes, the controller 20 determines the starting tendency of the driver at step S90, and controls the shift-speed according to the starting tendency index at step S100.

As described above, according to various embodiments of the present invention, the controller 20 determines the starting tendency of the driver when the predetermined time passes after the variation of the accelerator pedal position is greater than the predetermined value and the filtering time passes. Random operations of the accelerator pedal while the filtering time is caused by incorrect driving habits. Therefore, the random operation is not considered when the starting tendency is determined.

At the step S20, when the vehicle speed is greater than the predetermined vehicle speed, the controller 20 determines whether the vehicle speed is greater than the predetermined vehicle speed when adding an offset speed at step S30. When the vehicle speed is greater than the predetermined vehicle speed when adding the offset speed, the controller 20 deactivates the control mode according to the starting tendency, and performs control according to the long term driving tendency and the short term driving tendency at step S32.

At the step S30, when the vehicle speed is less than the predetermined vehicle speed when adding the offset speed, that is, the vehicle speed is between the predetermined vehicle speed and the predetermined vehicle speed when adding the offset speed, the controller 20 deactivates the starting tendency determination mode at step S40, and moves to the step S10.

For example, assume that the predetermined vehicle speed is 30 kph (km/hour) and that the offset speed is 10 kph. If the vehicle speed is 20 kph, the controller 20 activates the control mode according to the starting tendency and determines the starting tendency of the driver by activating the starting tendency determination mode. The shift-speed is controlled according to the starting tendency.

If the vehicle speed is 35 kph, since the starting tendency determination mode is deactivated, the controller 20 does not determine the starting tendency of the driver. However, since the control mode according to the starting tendency is activated, the transmission 30 is controlled according to the starting tendency when the starting tendency that is previously calculated is greater than short term driving tendency or long term driving tendency.

As described above, when the vehicle speed is between the predetermined vehicle speed and the predetermined vehicle speed when adding the offset speed (that is, the vehicle is near the predetermined vehicle speed), the controller 20 does not determine the starting tendency. However, since the control mode according to the starting tendency is activated, the controller 20 controls the shift-speed according to the starting tendency that is previously calculated.

If the vehicle speed is 45 kph, since the starting tendency determination mode and the control mode according to the starting tendency are deactivated, the controller 20 controls the transmission 30 according to the short term driving tendency or the long term driving tendency.

Hereinafter, the method of determining the starting tendency will be described in detail.

Figure 3:
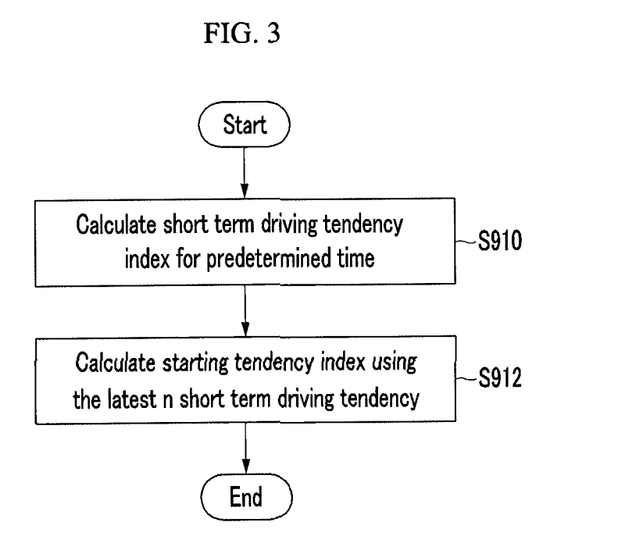
FIG. 3 is a flowchart for determining the driver's starting tendency according to the present invention.
Figure 4:
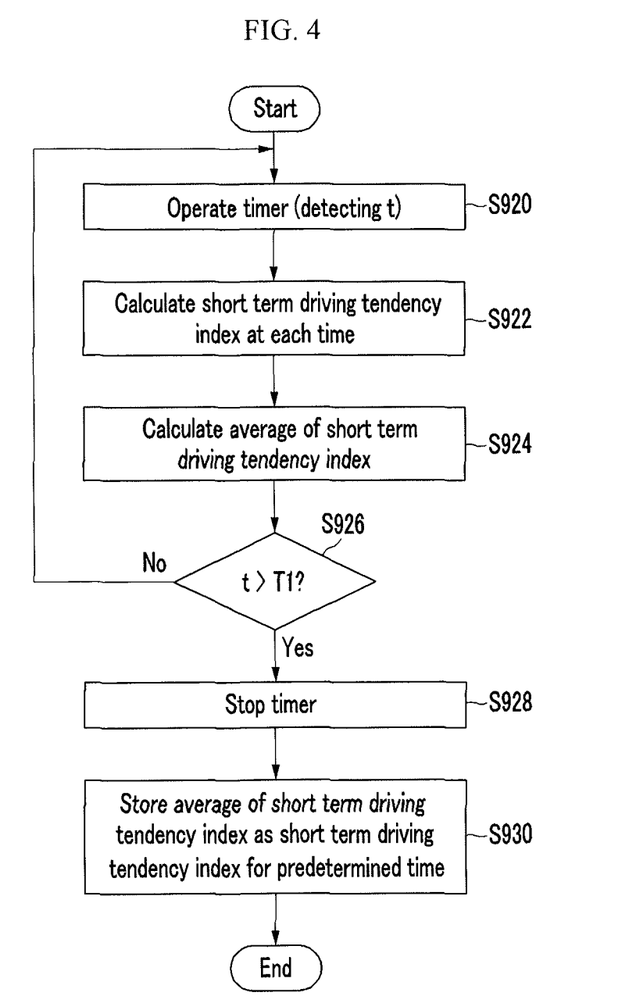
FIG. 4 is a flowchart of an exemplary method of calculating a short term driving tendency index for a predetermined time in an exemplary method of determining a long term driving tendency of the driver according to the present invention.

FIG. 3 is a flowchart for determining a driver's starting tendency according to various embodiments of the present invention. FIG. 4 is a flowchart of a method of calculating a short term driving tendency index for a predetermined time in a method of determining a long term driving tendency of a driver according to various embodiments of the present invention.

As shown in FIG. 3, the controller 20 calculates the short term driving tendency index for a predetermined time $T_1$ at step S910.

That is, as shown in FIG. 4, the controller 20 operates a timer and detects an elapsed time t at step S920.

After that, the controller 20 calculates the short term driving tendency index SI at each time at step S922, and calculates an average of the short term driving tendency index at each time at step S924.

After that, the controller 20 determines whether the elapsed time t is greater than the predetermined time $T_1$ at step S926. If the elapsed time t is not greater than the predetermined time $T_1$, the controller 20 returns to the step S920. If the elapsed time t is greater than the predetermined time $T_1$, the controller 20 stops the timer at step S928, and stores the average of the short term driving tendency index as the short term driving tendency index SI_Avg for the predetermined time at step S930. That is, the short term driving tendency index SI_Avg for the predetermined time is calculated from the following equation:

$$SI\_Avg = \frac{\sum_{t=t_o}^{t_o+T_1(Sec)} SI}{T_1(sec)}$$

If the short term driving tendency index for the predetermined time is calculated at the step S910, the controller 20 calculates the starting tendency index SI_start using the latest n short term driving tendency indexes from the following equation at step S912:

$$SI\_start = \frac{\sum_{i=1}^{n} SI\_Avg_{n-i+1} \times W_i}{nT_1}$$

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A system of determining starting tendency of a driver, comprising:
   a vehicle speed sensor detecting a vehicle speed;
   an accelerator pedal position sensor detecting an accelerator pedal position; and a controller receiving information on input variables including the accelerator pedal position, the vehicle speed from the accelerator pedal position sensor or the vehicle speed sensor, determining a short term driving tendency which is represented by a short term driving tendency index, a long term driving tendency which is represented by a long term driving tendency index, and a starting tendency of the driver which is represented by a starting tendency index, based on the information, and controlling operation of an engine or a shift-pattern of a transmission according to the short term driving tendency index, the long term driving tendency index, and the starting tendency index, wherein the controller continuously determines the short term driving tendency index of the driver for a predetermined time and determines the starting tendency index of the driver from a predetermined number (n) of short term driving tendency indexes of the driver.

2. The system of claim 1, wherein the controller determines the starting tendency index of the driver from latest n short term driving tendency indexes of the driver.

3. The system of claim 1, wherein the controller determines the starting tendency index of the driver when the vehicle is not initially stopped and a variation of the accelerator pedal position is greater than a predetermined value after a control mode according to the starting tendency index of the driver and a starting tendency determination mode are activated.

4. The system of claim 3, wherein the control mode of the starting tendency index of the driver is activated when the vehicle speed is less than a predetermined vehicle speed.

5. The system of claim 3, wherein the controller determines the starting tendency index of the driver when a predetermined time passes after the variation of the accelerator pedal position is greater than the predetermined value and a filtering time passes.

6. The system of claim 1, wherein the controller determines the starting tendency index (SI_start) of the driver from the equation of $$\text{SI\_start} = \frac{\sum_{i=1}^{n} \text{SI\_Avg}_{n-i+1} \times W_i}{nT_1},$$

wherein $\text{SI}_{13}$ $\text{Avg}_i$ represents an i-th short term driving tendency index of the driver, $T_1$ represents the predetermined time, and $W_i$ represents an i-th weight value.

7. The system of claim 6, wherein the weight values satisfy a relation of $W_i \leq W_{i+1}$.

8. The system of claim 6, wherein a sum of n weight values is 1.

9. The system of claim 1, wherein the operation of the engine includes controlling of an engine torque or an engine torque filter.

* * * * *